US 9,216,689 B2

United States Patent
Meadows

(10) Patent No.: US 9,216,689 B2
(45) Date of Patent: Dec. 22, 2015

(54) FAIL-SAFE MIRROR FOR SIDE CAMERA FAILURE

(71) Applicant: HONDA MOTOR CO., LTD., Tokyo (JP)

(72) Inventor: Eric Meadows, Tampa, FL (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/107,726

(22) Filed: Dec. 16, 2013

(65) Prior Publication Data

US 2015/0165975 A1 Jun. 18, 2015

(51) Int. Cl.
*B60R 22/00* (2006.01)
*B60R 1/00* (2006.01)
*B60R 1/074* (2006.01)

(52) U.S. Cl.
CPC . *B60R 1/006* (2013.01); *B60R 1/00* (2013.01); *B60R 1/074* (2013.01); *B60R 2300/8026* (2013.01); *B60R 2300/8046* (2013.01)

(58) Field of Classification Search
None
See application file for complete search history.

(56) References Cited

U.S. PATENT DOCUMENTS

| | | | |
|---|---|---|---|
| 5,375,014 A | 12/1994 | Fujie et al. | |
| 6,109,755 A | 8/2000 | Duroux et al. | |
| 6,505,944 B1 | 1/2003 | Lewis | |
| 7,852,024 B2 | 12/2010 | Sho et al. | |
| 2002/0126206 A1 | 9/2002 | Hunte | |
| 2010/0020170 A1 * | 1/2010 | Higgins-Luthman et al. | 348/135 |
| 2012/0087573 A1 * | 4/2012 | Sharma et al. | 382/154 |
| 2014/0015975 A1 * | 1/2014 | Pastrick et al. | 348/148 |

* cited by examiner

Primary Examiner — Adam Alharbi
(74) Attorney, Agent, or Firm — Arent Fox LLP

(57) ABSTRACT

A system includes a camera mounted to a vehicle, a display in communication with the camera and configured to display an image detected by the camera, and a side mirror assembly. The side mirror assembly includes a side mirror moveable between a recessed position and a deployed position, and an actuator configured to deploy the side mirror into the deployed position. The system includes a status detector configured to detect a negative operational status of the camera, and, when the negative operation status is detected, cause the actuator to deploy the side mirror into the deployed position.

20 Claims, 8 Drawing Sheets

FAIL-SAFE MIRROR FOR SIDE CAMERA FAILURE

CROSS-REFERENCE TO RELATED APPLICATIONS

N/A

FIELD OF THE INVENTION

The present invention relates to safety and convenience features for visibility in motor vehicles. More particularly, the invention relates to a fail-safe mirror that can be deployed either manually or automatically in response to a negative status detected for a vehicle side camera.

BACKGROUND OF THE INVENTION

Modern vehicles often incorporate cameras to assist the operator in observing the space surrounding the vehicle. Depending upon their position, the cameras may be able to observe regions surrounding the vehicle that cannot be observed with conventional mirrors (i.e., blind spots) making cameras a safer alternative to conventional mirrors.

The cameras may include, for example, a backup camera to allow the operator to observe the space behind the vehicle while reversing. Additionally, some vehicles incorporate side cameras that provide a view of the region to the side and rear of the vehicle. In many cases, these cameras provide a similar view to that ordinarily achieved with conventional side or wing mirrors. As cameras become more prevalent in newer vehicles, the side cameras may ultimately replace conventional side mirrors. When operational, the side cameras provide an adequate alternative to conventional side mirrors.

Unfortunately, in a vehicle having only side cameras and no side mirrors, a failure of the side camera systems means that the operator is unable to easily view the region to the side of and behind the vehicle.

SUMMARY OF THE INVENTION

The present invention overcomes the aforementioned drawbacks by providing a visual safety and convenience system including a fail-safe side mirror system.

In one embodiment, a system includes a camera mounted to a vehicle, a display in communication with the camera and configured to display an image detected by the camera, and a side mirror assembly. The side mirror assembly includes a side mirror moveable between a recessed position and a deployed position, and an actuator configured to deploy the side mirror into the deployed position. The system includes a status detector configured to detect a negative operational status of the camera, and, when the negative operation status is detected, cause the actuator to deploy the side mirror into the deployed position.

In another embodiment, a system includes a camera connected to a vehicle, and a status detector in communication with the camera. The status detector is configured to monitor an operational status of the camera. The system includes a deployable side mirror assembly in communication with the status detector. The deployable side mirror assembly is configured to deploy a side mirror upon detection of a negative operational status of the camera.

In another embodiment, a method includes monitoring, by a computer processor, a status of at least one vehicle camera, and detecting, by the computer processor, a negative status of the at least one vehicle camera. The negative status indicates that the at least one vehicle camera is not operating correctly. The method includes, in response to detecting the negative status of the at least one vehicle camera, deploying, by the computer processor, the at least one side mirror.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
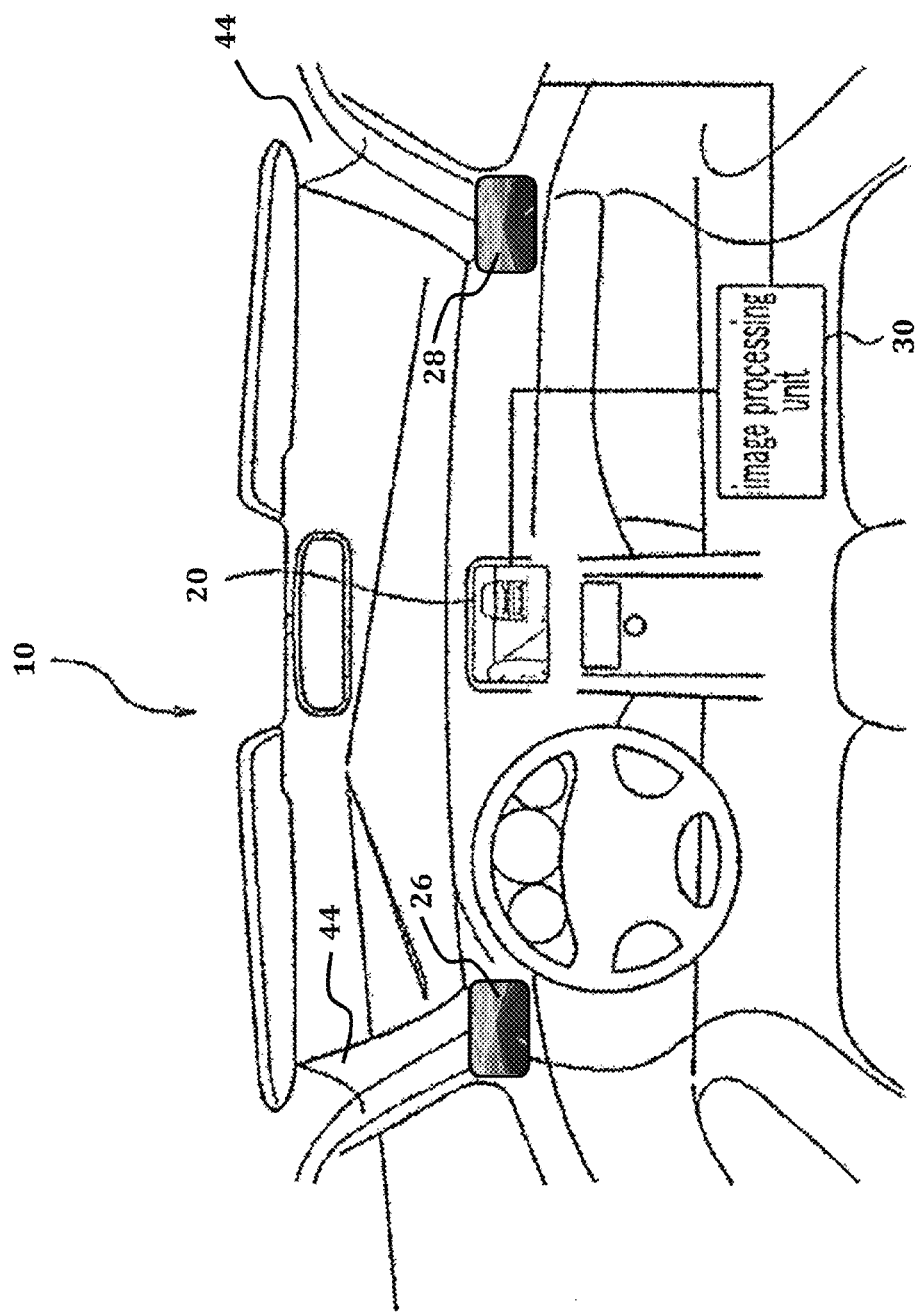
FIG. 1 is an illustration of a vehicle interior depicting components of an embodiment of the visual safety and convenience system in which the side mirrors have not been deployed.

The disclosure relates in general to a system and method for a camera system for viewing regions to the sides and rear of a vehicle and, more particularly, to a system and method for a visual safety and convenience system including a fail-safe side mirror assembly for deployment upon detection of a negative status, (e.g., failure) of the camera system.

The present system and method is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the invention.

Any schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed in any such flow chart diagrams are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

In the present visual safety and convenience system, a pair of hidden side mirrors are configured to deploy upon the detection of a negative status of one or more side camera equipped on the vehicle. For example, the side mirrors can deploy upon detection of a fault in the side camera system. In another embodiment, the side mirrors can be deployed based on a particular condition of the vehicle, such as the current speed at which the vehicle is traveling. In yet another embodiment, the side mirrors are deployed (and retracted) by a user of the vehicle for the convenience of a user. In this case, the user can choose whether to use side cameras or side mirrors based on a given operating scenario.

In some embodiments, the mirrors can be hidden behind the vehicle's dash or near or in the vehicle's A-pillar. When hidden, the mirrors may be smoothly integrated into the vehicle's frame to minimize air resistance generated by the mirrors. The mirrors may be deployed, and thereby presented to the user, if desired, by the activation of an appropriate user interface that will release the mirrors from a hidden state. Alternatively, if the vehicle's control unit detects a failure within the vehicle's side camera system, the mirrors may be automatically deployed. This mechanism can operate solely as a fail-safe, wherein the mirrors are configured to be automatically deployed, but must be manually retracted. The mirrors may be retracted within the vehicle's frame via a latching mechanism. Such a mechanism may require minimal user pressure to retract the mirror into the vehicle body, thereby activating the latching mechanism. The latching mechanism retains the mirrors until their deployment.

In one implementation, when retracted, the mirrors blend seamlessly with the body of the vehicle. When deployed, the mirrors pop-up from their recessed location to provide good visibility to the user. The fail-safe mirrors can be constructed to include large convex mirrors of adequate size to ensure a high level of visibility for all users, regardless of head height. This system can also be used in the same fashion with regards to a replacement of the rear-view mirror with a camera/display setup.

In some aspects, the mirrors are configured to be deployed upon the failure or malfunction of a side camera assembly. Accordingly, one embodiment provides deployable mirrors, where the mirrors are deployed upon the detection of a failure or negative status of a side camera system. In one aspect, the system automatically deploys the mirrors (i.e., without user intervention) upon detecting a failure of the side camera system or other significant vehicle fault.

In certain embodiments of the present system and methods, a user is referred to. Here, a user can be either a driver of a vehicle or a passenger of the vehicle. Furthermore, in some embodiments, a user can be another operator of a vehicle such as a mechanic, a police or fire officer, a paramedic or any other user that would desire to operate the described fail-safe mirrors.

Referring now to the figures, FIG. 1 is an illustration of a vehicle interior depicting components of an embodiment of the visual safety and convenience system in which the side mirrors have not been deployed. A vehicle 10 has an interior that can include a number of components. In certain embodiments, the vehicle 10 includes one or more side camera assemblies such as a left/driver side camera assembly 22 and a right/passenger side camera assembly 24 (see FIGS. 4A and 5A). The side camera assemblies 22, 24 include a suitable camera, such as a digital camera, a night vision camera, radar, scanning laser sensor, an infra-red camera, other types of visual or non-visual sensors, and the like, as well as combinations thereof. The side camera assemblies 22, 24 can be positioned in or on the vehicle 10 in any suitable location in order to obtain a side-view or rear-view of the vehicle 10, or any other desired view of the vehicle 10. In one example, a side camera is positioned in order to provide a view to a user that would be analogous to a view provided by a traditional side mirror or wing mirror. In another example, the side camera provides a view of the rear of a vehicle similar to a view provided by a rear camera or back-up camera.

In certain embodiments, the side cameras are in communication with an image processing unit 30. The image processing unit can be a part of a vehicle on-board computer system, electronic control unit (ECU), or other processor. In one example, the image processing unit is configured to receive image data obtained by the one or more side cameras and provide a set of visual data. The set of visual data can be displayed on a visual display such as in-dash visual display 20 or peripheral displays 26, 28. In some cases, the displays, such as peripheral displays 26, 28, are positioned in locations nearby the location where the side mirrors would ordinarily be positioned. This ensures that a driver who is used to looking for side mirrors will naturally look to the displays when reflexively looking for the mirrors. Alternatively, the visual display can be a component of a rear view mirror assembly or a peripheral display. In another embodiment, the image processing unit is in communication with a portable device such as a smart phone or portable GPS device (not shown). In other embodiments, the visual displays, including displays 20, 26 and 28, are positioned in any suitable location within the cabin of the vehicle.

Figure 2:
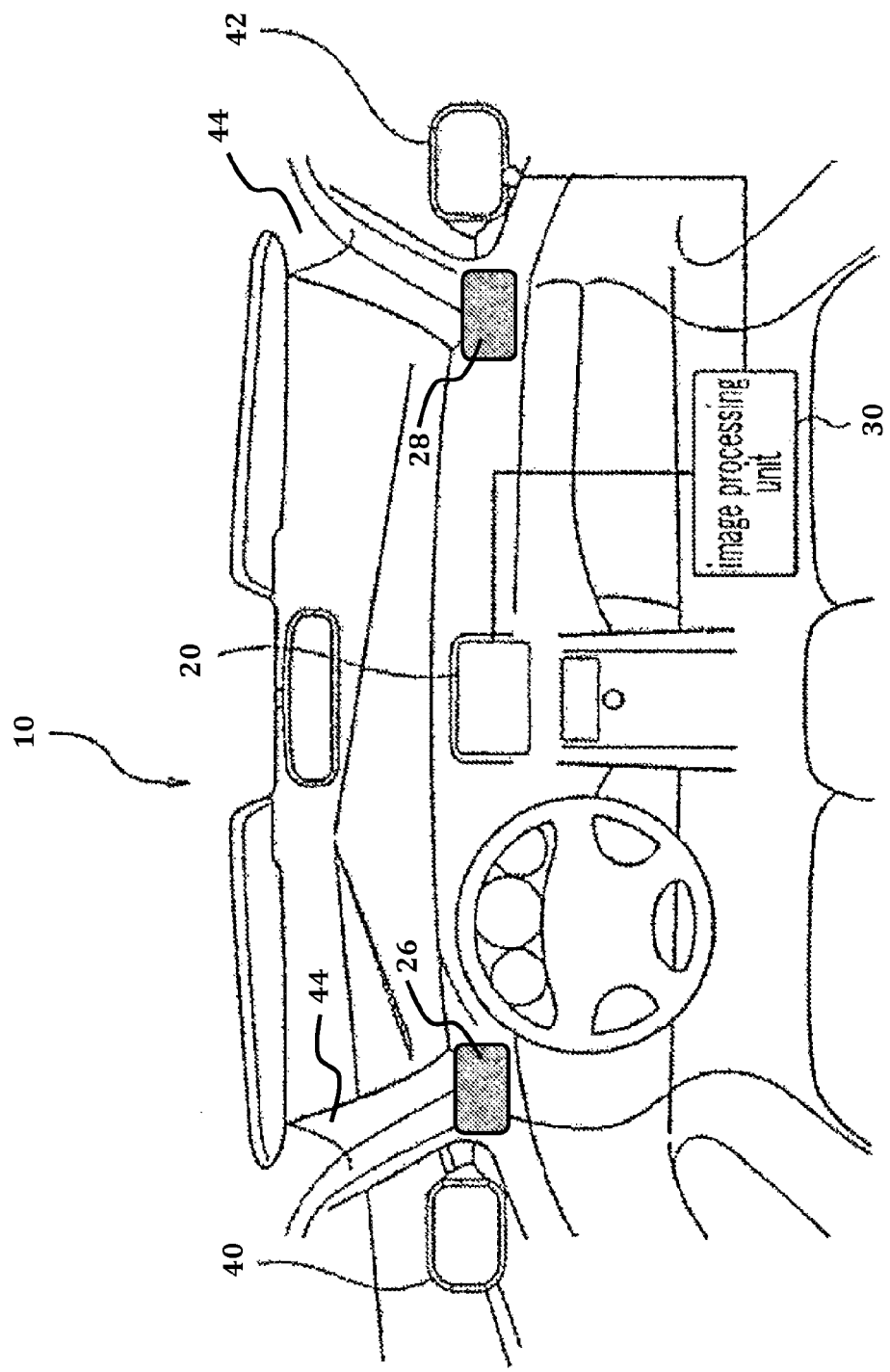
FIG. 2 is an illustration of a vehicle interior depicting components of an embodiment of the visual safety and convenience system in a first scenario in which the side mirrors have been deployed.

Referring to FIG. 2, an illustration of a vehicle interior is provided. The illustration depicts components of an embodiment of the visual safety and convenience system in a first scenario in which the side mirrors 40, 42 have been deployed. In one aspect of this scenario, the side mirrors 40, 42 are deployed automatically based on the detection of a negative status of the side cameras, visual display 20, and/or image processing unit 30. In another aspect of this scenario, the side mirrors 40, 42 can be deployed manually (i.e., as the result of a user determination to deploy the side mirrors) based on the detection of a negative status of the side cameras, visual display 20, and/or image processing unit 30. In this second case, the user can be provided with an alert, such as an audible or visual alert, to indicate that there has been a side camera failure and/or negative status of the side camera detected.

A negative status of the side cameras can encompass a number of possibilities. In some aspects, the negative status includes a visual obstruction such as a loss of image, an obscured image, a distorted image, a saturated image, a low-contrast image and a partial image. In one case, a negative status includes a side camera failure such as a loss of signal or a reduction/change in signal quality. For example, the image processing unit or an independent status detector may be capable of detecting the amount of noise (e.g., random fluctuations in the signal) in the image data generated by the side cameras. In this situation, the image processing unit or status detector can determine if the amount of noise (or a signal-to-noise ratio) exceeds a given threshold value. Similarly, the number of functional data points/pixels can be detected to determine if there has been a camera failure, such as if the number of non-functional (dead) pixels exceeds a threshold value. Alternatively, the image processing unit or status detector may be able to detect an undesirable signal (e.g., snow or static).

In yet another example, the image processing unit or status detector may be capable of detecting brightness and contrast levels in order to determine image quality and whether or not a side camera failure has occurred. In one example involving brightness/contrast detection, the sun or another bright light (e.g., a streetlight or a vehicle headlight) may be shining directly into a detector component of a vehicle side camera resulting in reduced contrast and/or excessive brightness levels. In this case the picture may be washed out and would therefore result in a side camera failure or at least an image that does not provide the driver with useful information. In a similar example, low or no light conditions can result in insufficient light incident on the side camera detector resulting in a reduced contrast and/or insufficient brightness levels. However, in this latter case, the side cameras can include a night vision or thermal detection component in order to operate effectively in various situations during the day (e.g., operation of the vehicle in a tunnel) or at night when there is little or no light.

Side mirrors 40, 42 can be included in the construction of the vehicle 10 such that the side mirrors 40, 42, when deployed, occupy traditional positions on the driver's and passenger's sides of vehicle such as on the vehicle's A-pillar 44 (forward-most pillar). Alternatively, the side mirrors 40, 42 can be configured to deploy from other locations in the body of the vehicle. In one example, the side mirrors 40, 42 are deployed from a location on the hood of the vehicle, while in another example, the side mirrors 40, 42 are deployed from a location on the interior of the vehicle. Furthermore, the side mirrors can be controlled to deploy together or independently. For example, the side mirror on the driver's side of the vehicle can be deployed without deploying the side mirror on the passenger's side of the vehicle.

When in their recessed or stowed position, side mirrors 40, 42 may be configured to present minimal air resistance, thereby enabling more efficient operation of the vehicle. The mirrors 40, 42 may be coupled to a spring-loaded deployment mechanism, wherein the spring is configured to provide sufficient force to transition the mirrors 40, 42 from their respective recessed positions to their respective deployed positions.

Referring again to FIG. 2, in the embodiment shown, the visual display 20 no longer displays data obtained from the image processing unit. In one aspect, the visual display 20 is configured to be disabled upon manual or automatic deployment of the side mirrors 40, 42. In another aspect, a detector, such as the image processing unit or another component such as an independent status detector, is configured to detect that the visual display is showing a poor quality image such as an obscured image or a saturated image. In this case the detector is configured to deploy the side mirrors 40, 42 in response the status of the visual display. In another embodiment, upon deployment of the side mirrors, a user can optionally deactivate (turn off) the visual display.

Figure 3:
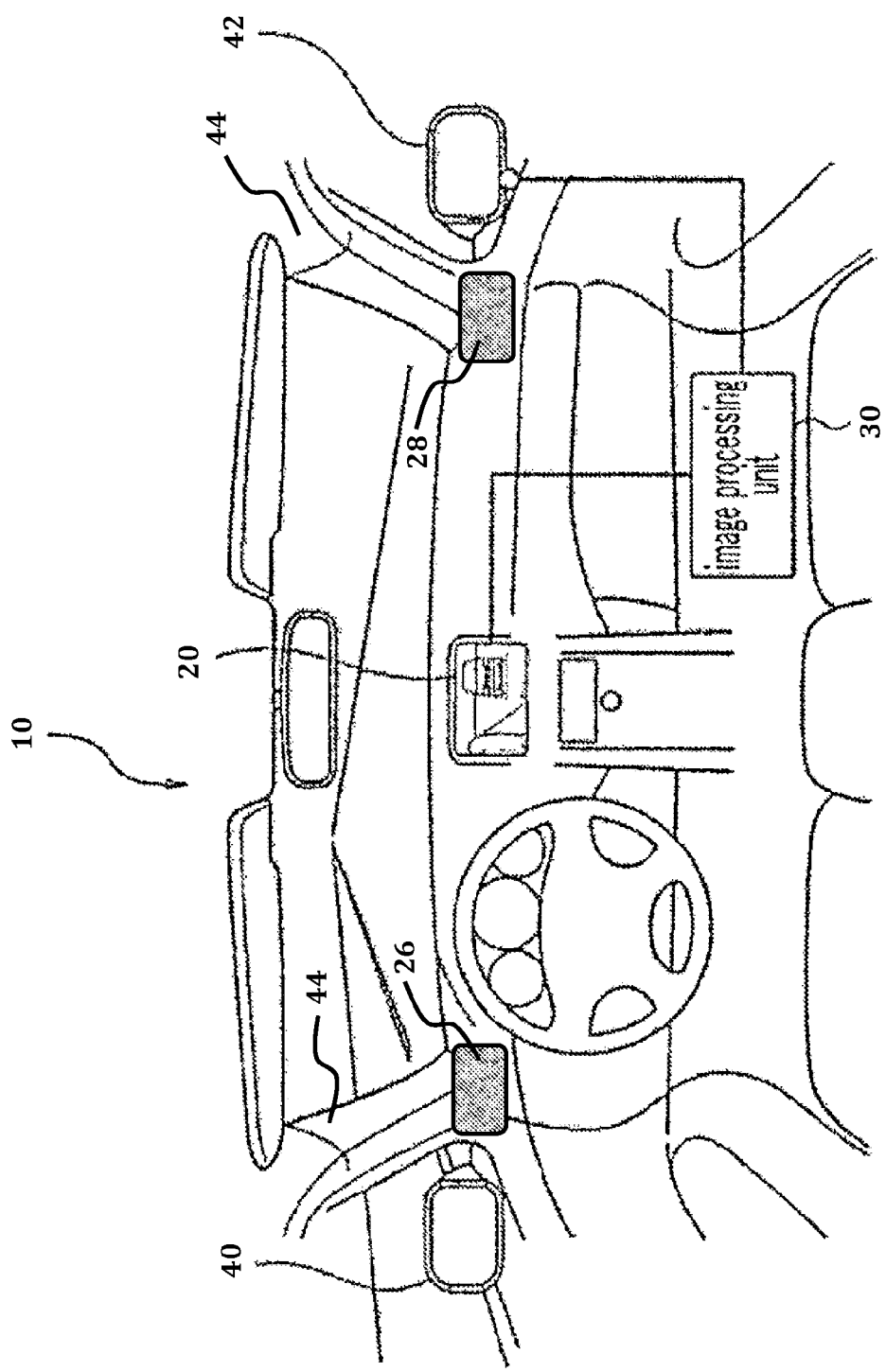
FIG. 3 is an illustration of a vehicle interior depicting components of an embodiment of the visual safety and convenience system in a second scenario in which the side mirrors have been deployed.

An alternative embodiment of a vehicle interior in which the side mirrors 40, 42 have been deployed is illustrated in FIG. 3. In this embodiment, the visual display 20 may still be operational. In one aspect, a user of the vehicle can selectively deploy the side mirrors 40, 42 regardless of the detection of a negative status of the visual display 20, image processing unit 30, or side cameras. Similarly, in some embodiments, after deployment of the side mirrors, a user can optionally deactivate (turn off) the visual display.

Figure 4B:
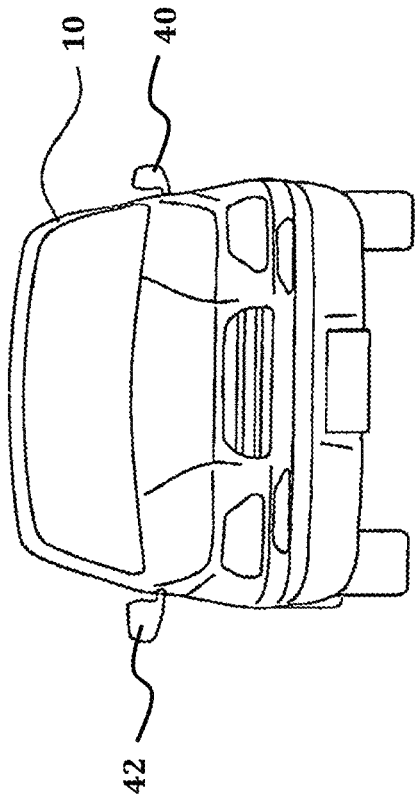
FIG. 4B is an illustration of a front view of a vehicle exterior depicting components of an embodiment of the visual safety and convenience system in which the side mirrors have been deployed.
Figure 4A:
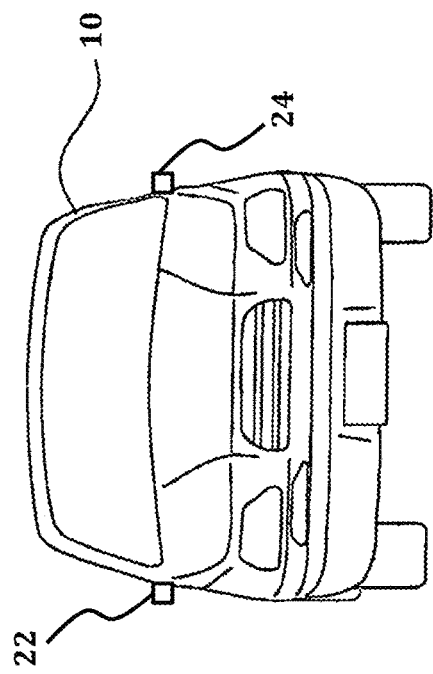
FIG. 4A is an illustration of a front view of a vehicle exterior depicting components of an embodiment of the visual safety and convenience system in which the side mirrors have not been deployed.
Figure 5B:
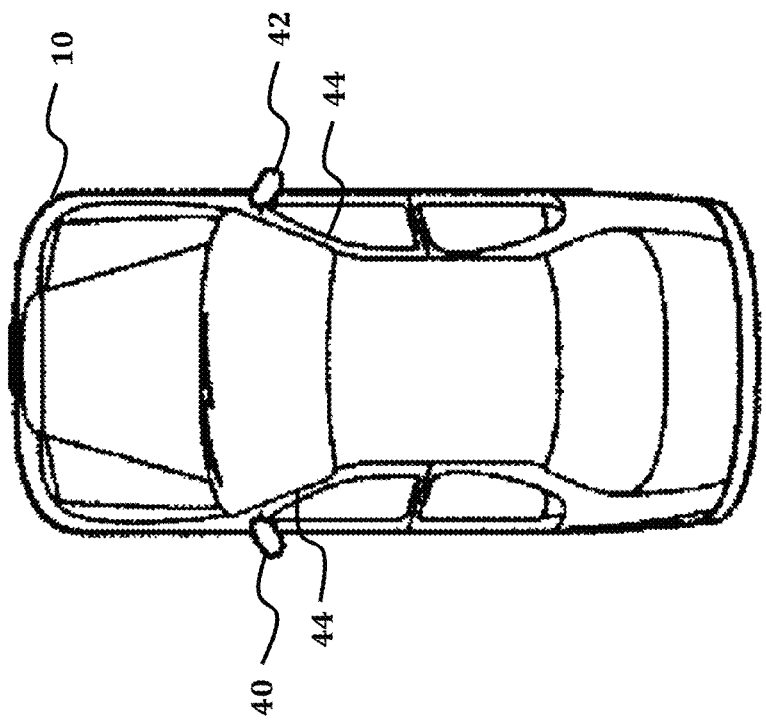
FIG. 5B is an illustration of a top view of a vehicle exterior depicting components of an embodiment of the visual safety and convenience system in which the side mirrors have been deployed.
Figure 5A:
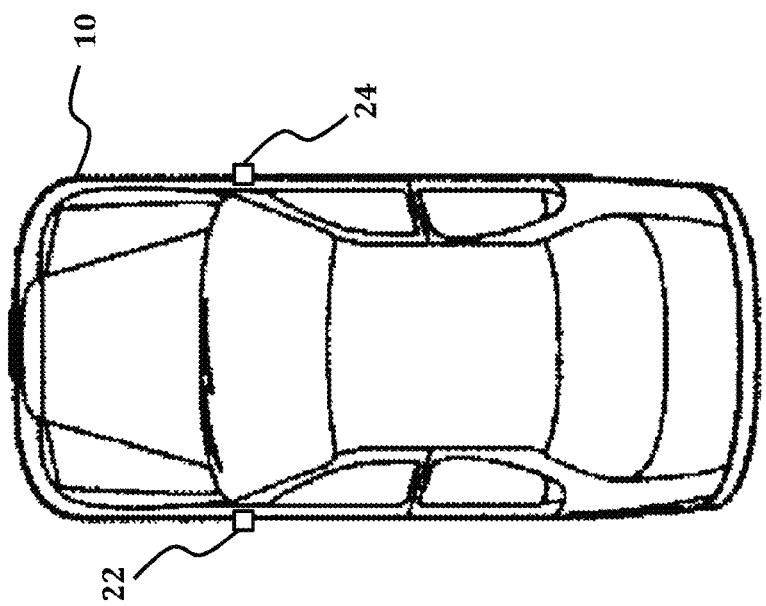
FIG. 5A is an illustration of a top view of a vehicle exterior depicting components of an embodiment of the visual safety and convenience system in which the side mirrors have not been deployed.

Referring now to FIGS. 4A and 4B, front views of a vehicle exterior depict components of an embodiment of the visual safety and convenience system. FIG. 4A illustrates an embodiment in which the side mirrors have not been deployed. While FIG. 4B depicts an embodiment in which the side mirrors have been deployed. Similarly, FIGS. 5A and 5B are illustrations of a plan view of a vehicle exterior depicting components of an embodiment of the visual safety and convenience system. FIG. 5A shows an embodiment in which the side mirrors have not been deployed, while FIG. 5B depicts an embodiment in which the side mirrors have been deployed. In one aspect, FIGS. 4A and 5A can be analogous to FIG. 1 and FIGS. 4B and 5B can be analogous to FIG. 2.

Figure 6:
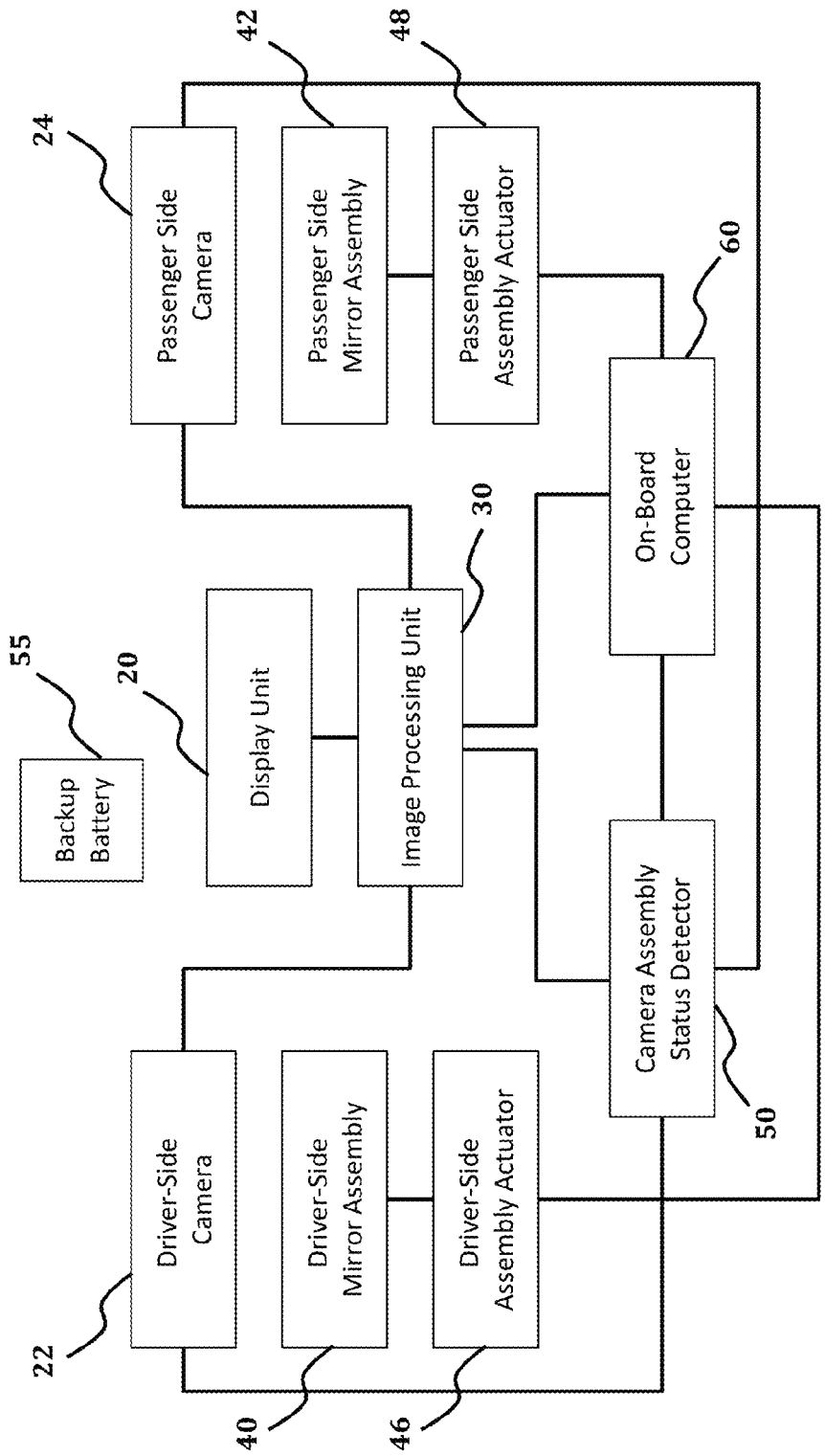
FIG. 6 is a block diagram depicting functional components of an embodiment of the visual safety and convenience system.

Referring to FIG. 6, a block diagram depicts the components of an embodiment of the visual safety and convenience system. The depicted embodiment includes side cameras 22, 24 and side mirrors/mirror assemblies 40, 42 on both the driver's and passenger's sides of the vehicle. Each of the side mirror assemblies 40, 42 is also in communication with side mirror assembly actuator 46, 48. The system further includes a display unit 20, an image processing unit 30, a camera assembly status detector 50 and on-board computer 60.

The image processing unit 30 is in communication with side cameras 22, 24, display unit 20, camera assembly status detector 50 and on-board computer 60. The image processing unit 30 can receive image data from side cameras 22, 24 and transmit processed image data to the visual display unit 20 for viewing by a user of a vehicle such as vehicle 10. In some embodiments, image processing unit 30 is distinct from on-board computer 60, and in other embodiments image processing unit 30 is a component of on-board computer 60. In still other embodiments, image processing unit 30 is not required and instead, side cameras 22, 24 are in direct communication with display unit 20 or in indirect communication via on-board computer 60.

As illustrated in FIG. 6, camera assembly status detector 50 is in communication with side cameras 22, 24 for detection of a side camera failure or more generally, a negative status of side cameras 22, 24. In this case, status detector 50 is in communication with image processing unit 30 and on-board computer 60. In one aspect, image processing unit 30 communicates a negative status/camera failure to status detector 50, while in another aspect, status detector 50 can determine a negative status/camera failure via direct communication with side cameras 22, 24. In an alternative embodiment, a distinct status detector 50 is not required, in which case, side cameras 22, 24 can be in direct communication with on-board computer 60.

On-board computer 60 is in communication with image processing unit 30, status detector 50 and assembly actuators 46, 48. Status detector 50 can communicate with on-board computer 60 or via image processing unit 30 to relay a status of side cameras 22, 24. In embodiments in which status detector 50 is absent, the status of side cameras 22, 24 can be relayed to on-board computer 60 directly or via image processing unit 30. In the embodiment illustrated in FIG. 6, on-board computer 60 can communicate with assembly actuators 46, 48 to actuate deployment of side mirrors 40, 42. However, in other embodiments, status detector 50 can communicate with assembly actuators 46, 48 to actuate deployment of side mirrors 40, 42. In some aspects, a user can communicate directly or indirectly with on-board computer 60 or assembly actuators 46, 48 to selectively deploy either or both of side cameras 40, 42.

In addition to the components shown in the block diagram illustrated in FIG. 6, the fail-safe camera system can further include a condition detector (not shown). The condition detector can be a distinct component of a vehicle or included as a part of another component such as status detector 50 or on-board computer 60. The condition detector can monitor a condition of an on-board vehicle system and actuate deployment of side mirrors 40, 42 upon detection of a negative condition of the vehicle by the condition detector. The condition detector is unique from the status detector in that the condition detector monitors the condition (status) of the vehicle systems, whereas the status detector 50 monitors the status of side cameras 22, 24 and the image obtained from said side cameras.

The on-board vehicle systems can include a traction control system, an anti-lock braking system, a dynamic stability control system, a speedometer, a fuel meter, a vehicle battery power meter, an on-board computer and the like. In one embodiment, the purpose of the vehicle condition detector is to deploy to side mirrors under circumstances where a negative status of the side cameras is not necessarily detected. In one aspect, the condition detector monitors whether an air bag has been deployed or if the anti-lock braking system or traction control system has activated. In these situations, it can be desirable to provide a user of the vehicle with additional visibility of the regions to the sides and rear of the vehicle. The condition detector may also detect the environmental conditions in which the vehicle is operating. If, for example, the condition detector detects icy or severely rainy conditions, the side mirrors may be automatically deployed for safety reasons.

In another embodiment, a relevant condition of the vehicle for deploying the side mirrors can be the speed of the vehicle. For example, a user or vehicle manufacturer can program the condition detector to deploy the side mirrors when the vehicle is operated below a certain speed, such as 50 kilometers per hour (kph), or about 30 miles per hour (mph). However, when the vehicle is operated at higher speeds, (i.e., greater than 50 kph) the condition detector can determine that the side mirrors should be retracted. In one aspect, retracting the side mirrors at higher vehicle speeds can result in improved fuel economy.

Continuing with FIG. 6 an additional component that can be included is a backup battery 55. The backup battery 55 provides backup electrical energy to allow for deployment of the side mirrors 40, 42 in the event of an electrical failure within the vehicle 10. In case of such a failure, the backup battery 55 can provide power to operate the actuators 46, 48 to deploy the side mirrors 40, 42, and provide power to the status detector 50. In some cases, upon detecting a power failure in the vehicle, both side mirrors 40, 42 will automatically be deployed. In FIG. 6, connections to backup battery 55 are not illustrated. However, backup battery 55 is suitably in electrical communication with components of FIG. 6 that require power in the case of an electrical failure as would be appreciated by a person of ordinary skill in the art.

Figure 7B:
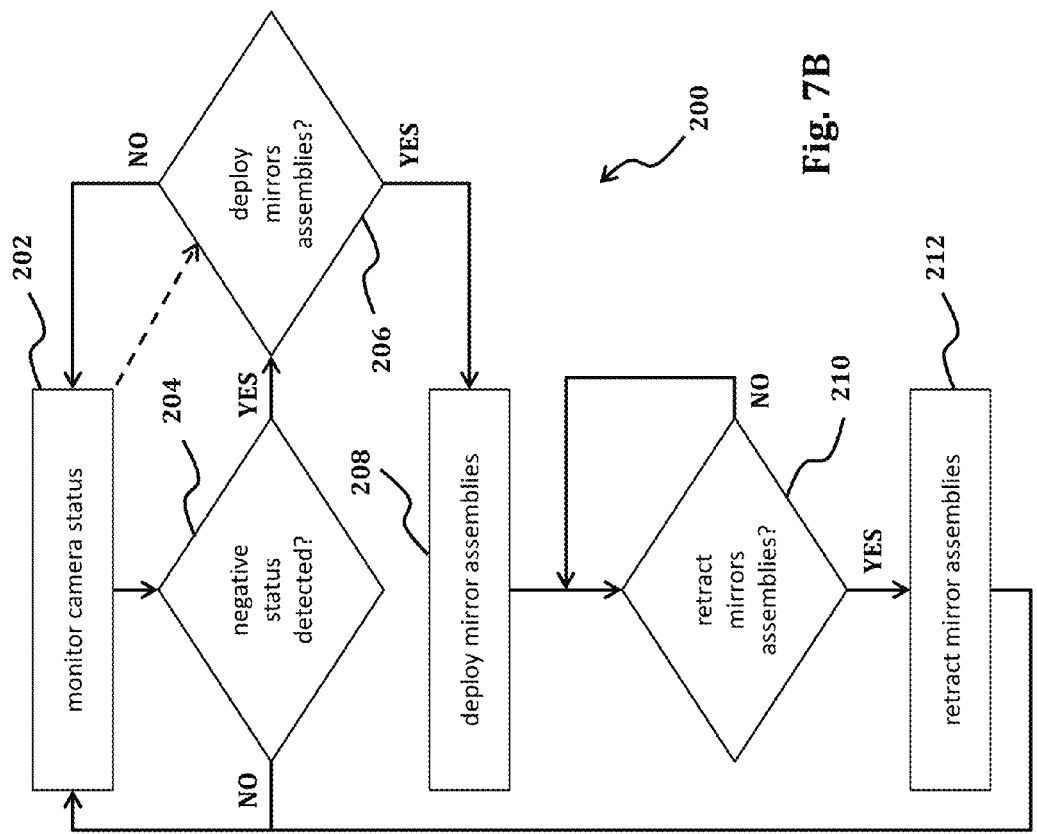
FIG. 7B is a schematic illustration of a second method for deploying a side mirror assembly.
Figure 7A:
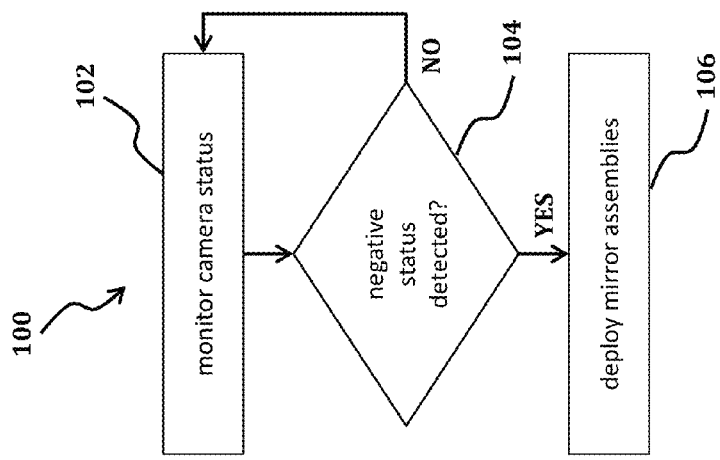
FIG. 7A is a schematic illustration of a first method for deploying a side mirror assembly.

Referring to FIGS. 7A and 7B, a first and second method for deploying a side mirror assembly are illustrated, respectively. In the first method 100 depicted in FIG. 7A, side mirrors are deployed automatically in response to the detection of a negative status of a side camera such as a side camera failure. In 102 of method 100, a user, such as a driver, is in the process of operating a vehicle. During operation of the vehicle, vehicle systems such as an on-board computer, image processing unit, or status detector monitor the status of one or more side cameras that the vehicle is equipped with. The user can use the cameras in the place of side mirrors to monitor regions to the sides and rear of the vehicle with the aid of a visual display present in the vehicle. While the vehicle is equipped with one or more side cameras, the vehicle is also equipped with one or more side mirrors in a retracted (i.e., non-deployed) state.

In 104 of method 102, the vehicle systems assess the status of the side cameras to determine if a negative status has been detected. If side cameras are functioning normally such that the user of the vehicle can readily view the regions to the sides and rear of the vehicle, then a negative status is not detected in 104 and the method 100 continues to 102. If however, a negative status of the side cameras is detected, then method 100 proceeds to step 106. In one example, during normal operation of the vehicle, an electrical problem may occur rendering the side cameras unable to transmit an image. In another example, a second vehicle may pass the present vehicle splashing mud or other debris onto the side cameras, such that the detector portion of the side camera is partially or completely obscured.

In 106 of method 100, a negative status has been detected (in 104) and the side cameras are likely no longer effective in communicating a view of the sides and rear of the vehicle to the user. Thus, a situation has occurred in which the presence of one or more side mirrors would be valuable. Thus, in 106, side mirrors/mirror assemblies are automatically deployed. In method 100, the user may not be queried as to whether the side mirrors should be deployed. Rather the side mirrors are deployed automatically without the option for the user to deploy the side mirrors manually. Furthermore, the option may not exist for the user to retract the side mirrors without physically returning the side mirrors to the retracted (non-deployed) position such as by pressing the side mirrors back into a recess in the body of the vehicle.

Referring now to method 200 depicted in FIG. 7B, an alternative embodiment of a method for operation of the fail-safe camera system is illustrated. 202 and 204 can be similar to 102 and 104 in method 100. For example, a user can be operating a vehicle with side cameras and retracted side mirrors as in method 100. However, in 204, if a negative status is detected, the method 200 proceeds to 206. In 206, the user is presented with the option of deploying the mirror assemblies. For example, in the case where debris is obstructing the view of the camera, the user may be able to remove the debris such that the side cameras can again provide a useful view of the sides and rear of the vehicle. In this case, the user may select "NO" in 206 and the method 200 continues to 202. Alternatively, the user may not be able to clear the debris such that the side camera image continues to be obscured. In this case, the user will desire that the side mirrors be deployed and therefore the user can select "YES". Note also that 202 can optionally proceed directly to 206. This optional configuration of method 200 can be implemented to allow the user the option of deploying the side mirrors even if a negative status is not detected.

The option to choose "YES" or "NO" can be provided to the user in a number of ways. For example, the user can be presented with an audible prompt such as an alarm or voice message. In another example the user can be presented with a visual prompt to choose whether to deploy the side mirror assemblies. The visual prompt can be an light up symbol or LED in the vehicle, such as in the dashboard. In another aspect, the visual prompt can be a message presented on the same visual display used to show the image provided by the side cameras, while in another aspect, a separate visual display can be used. The user can indicate a choice of "YES" or "NO" by depressing a button in the vehicle, such as on the steering wheel, or by touching a virtual button provided on a visual display, which can be configured to be a touch screen device. In another aspect, the user may provide an audible command to be received by a voice recognition system integrated with the vehicle systems. Furthermore, in some embodiments, the lack of a user input can result in a default selection after a period of time has elapsed (e.g., 10 seconds). The default input can be configured to be either the "YES" or "NO" option. In some aspects, this option can be configured by the vehicle manufacturer and/or the user.

In 208 of method 200, the side mirror assemblies are deployed. Note that in both methods 100 and 200, the step of deploying the side mirrors (106, 208) could involve deploying both mirrors upon detecting any of the side cameras has failed. Or, if only a single side camera is determined to have failed, a single mirror can be deployed on the corresponding side to the failed side camera. Once the side mirrors have been deployed, method 200 proceeds to 210 in which the user or the vehicle systems can make a determination to retract mirror assemblies. In this case, the side mirrors can be automatically retracted such as with an electric motor in communication with the vehicle systems. In one aspect, the user can make a determination that the side mirrors are no longer required.

In one example of method 200, the user has repaired the side cameras such that the side cameras are again functional. In this case, the user can make a choice to have the vehicle retract the side mirrors. In another example, the user chooses to deploy the side mirrors as the user prefers the use of the more traditional side mirrors over side cameras. In this example, the user may intend to operate the vehicle in a narrow ally or park the vehicle in a narrow space. In this situation, it can be desirable that the side mirrors be retracted to prevent damage to the vehicle. In yet another example, the vehicle systems can detect that the side cameras are now functioning properly and either automatically determined whether or not to retract the side mirrors or alternatively provide the option to the user as in 206 of method 200.

If a determination is not made to retract the mirror assemblies (i.e., "NO" is selected), the method 200 remains at 210. Conversely, if the determination is made to retract the side mirrors (i.e., "YES" is selected), method 200 proceeds to 212 in which the side mirrors are retracted into a non-deployed state. Once the mirrors have been retracted in 212, the method 200 then proceeds back to 202. Thus, if a further negative status is detected or if a driver again desires the use of the side mirrors in addition to or instead of the side cameras, the method 200 can proceed to 208 in which the side mirrors are deployed. Finally, the status detector in methods 100 and 200 can be interchanged with a vehicle condition detector in order to operate the vehicle condition detector in an analogous manner.

Figure 8:
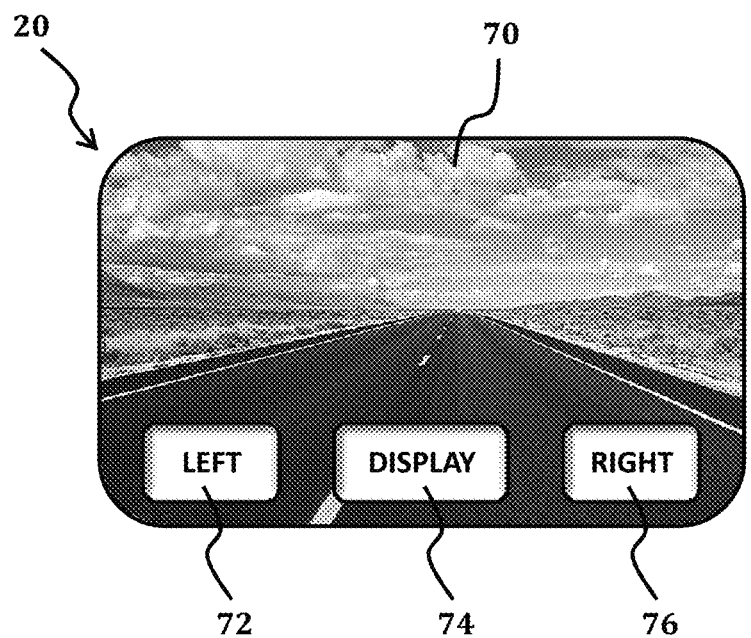
FIG. 8 is an illustration of a visual display according to the present visual safety and convenience system.

Referring now to FIG. 8, a non-limiting example of a visual display 20 is illustrated. The visual display 20 includes a screen 70 that can display an image such as a rear view of the vehicle (e.g., capture via a side camera, as described above), an interface for controlling vehicle audio, a GPS interface and the like. In the example shown in FIG. 8, the screen 70 shows a rear view of the vehicle and is overlaid with a number of selectable icons. The icons include a 'left' icon 72, a 'display' icon 74 and a 'right' icon 76. In one aspect, the 'left' and 'right' icons 72, 76 are selectable by a user to deploy or retract the left/driver and right/passenger mirror assemblies 40, 42. As described above, the option to select icons 72, 76 can be made available to the user only in certain situations. In one example, the icons 72, 76 are always available, and in another example, the icons 72, 76 are only available after a failure is detected. In another aspect, the icons 72, 76 are selected to switch between camera views in order to change from a driver side camera view to a passenger side camera view to a rear/backup camera view. In still another aspect, icon 74 is selected to turn the screen 70 of the visual display 20 'on' or 'off'. While the visual display 20 in FIG. 8 is shown as one example, other example are possible including the implementation of additional selectable icons and navigation between various screens or pages to set options associated the functions of the various components described herein.

The present invention has been described in terms of one or more preferred embodiments, and it should be appreciated that many equivalents, alternatives, variations, and modifications, aside from those expressly stated, are possible and within the scope of the invention.

The invention claimed is:

1. A system, comprising:
   a camera mounted to a vehicle;
   a display in communication with the camera and configured to display an image detected by the camera;
   a side mirror assembly, the side mirror assembly including:
      a side mirror moveable between a recessed position and a deployed position, and
      an actuator configured to deploy the side mirror into the deployed position; and
   a status detector configured to:
      detect a negative operational status of the camera, and
      when the negative operation status is detected, cause the actuator to deploy the side mirror into the deployed position.

2. The system of claim 1, wherein the status detector is configured to:
   monitor a condition of an on-board vehicle system; and
   when a predetermined condition of the on-board vehicle system is detected, cause the actuator to deploy the side mirror into the deployed position.

3. The system of claim 2, wherein the on-board system is selected from the group consisting of a traction control system, an anti-lock braking system, a dynamic stability control system, a speedometer, a fuel meter, a vehicle battery power meter and an on-board computer.

4. The system of claim 1, wherein the negative operational status of the camera is caused by a visual obstruction.

5. A system, comprising:
   a camera connected to a vehicle;

a status detector in communication with the camera, the status detector configured to monitor an operational status of the camera; and a deployable side mirror assembly in communication with the status detector, wherein the deployable side mirror assembly is configured to deploy a side mirror upon detection of a negative operational status of the camera.

6. The system of claim 5, including a visual display in communication with the camera, the visual display configured to display an image detected by the camera.

7. The system of claim 5, wherein the deployable side mirror assembly is configured to automatically deploy upon detection of the negative operational status of the camera by the status detector.

8. The system of claim 5, wherein the negative operation status is caused by a visual obstruction.

9. The system of claim 8, wherein the visual obstruction is selected from the group consisting of a loss of image, an obscured image, a distorted image, a saturated image, and a partial image.

10. The system of claim 5, including a condition detector, wherein the condition detector is configured to monitor a condition of an on-board vehicle system, and wherein the deployable side mirror assembly is configured to deploy the side mirror upon detection of a predetermined condition of the on-board vehicle system by the condition detector.

11. The system of claim 10, wherein the on-board system is selected from the group consisting of a traction control system, an anti-lock braking system, a dynamic stability control system, a speedometer, a fuel meter, a vehicle battery power meter and an on-board computer.

12. The system of claim 5, wherein the deployable side mirror assembly includes a powered retracting mechanism configured to retract the side mirror.

13. The system of claim 5, including a backup power configured to supply power to the deployable side mirror assembly.

14. A method, comprising:
monitoring, by a computer processor, a status of at least one vehicle camera;
detecting, by the computer processor, a negative status of the at least one vehicle camera, the negative status indicating that the at least one vehicle camera is not operating correctly; and
in response to detecting the negative status of the at least one vehicle camera, deploying, by the computer processor, at least one side mirror.

15. The method of claim 14, wherein deploying the at least one side mirror is performed without an instruction from a user.

16. The method of claim 14, wherein the negative status comprises a visual obstruction.

17. The method of claim 16, wherein the visual obstruction is selected from the group consisting of a loss of image, an obscured image, a distorted image, a saturated image, a low-contrast image and a partial image.

18. The method of claim 14, including monitoring a condition of an on-board system of a vehicle.

19. The method of claim 18, including:
detecting a negative condition of the on-board system of the vehicle; and
in response to detecting the negative condition of the on-board system, deploying the at least one side mirror.

20. The method of claim 19, wherein the on-board system is selected from the group consisting of a traction control system, an anti-lock braking system, a dynamic stability control system, a speedometer, a fuel meter, a vehicle battery power meter and an on-board computer.

* * * * *